US010526886B2

(12) United States Patent
Nguyen et al.

(10) Patent No.: US 10,526,886 B2
(45) Date of Patent: Jan. 7, 2020

(54) SYSTEMS AND METHODS EMPLOYING AN ACOUSTIC CALIPER TOOL WITH TOOL INCLINATION CORRECTION

(71) Applicant: Halliburton Energy Services, Inc., Houston, TX (US)

(72) Inventors: Quang Huy Nguyen, Houston, TX (US); Wei Hsuan Huang, Houston, TX (US); Vinodh Kumar Palani, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 17 days.

(21) Appl. No.: 15/561,330

(22) PCT Filed: Jun. 19, 2015

(86) PCT No.: PCT/US2015/036566
§ 371 (c)(1),
(2) Date: Sep. 25, 2017

(87) PCT Pub. No.: WO2016/204775
PCT Pub. Date: Dec. 22, 2016

(65) Prior Publication Data
US 2018/0106142 A1    Apr. 19, 2018

(51) Int. Cl.
*E21B 47/024* (2006.01)
*E21B 47/08* (2012.01)
(Continued)

(52) U.S. Cl.
CPC ............ *E21B 47/024* (2013.01); *E21B 44/00* (2013.01); *E21B 47/082* (2013.01); *G01V 1/50* (2013.01);
(Continued)

(58) Field of Classification Search
CPC ............................ E21B 47/024; E21B 47/082
See application file for complete search history.

(56) References Cited

U.S. PATENT DOCUMENTS

| | | |
|---|---|---|
| 5,726,951 A | 3/1998 | Birchak et al. |
| 5,899,958 A | 5/1999 | Dowell et al. |

(Continued)

FOREIGN PATENT DOCUMENTS

WO    2016204775 A1    12/2016

*Primary Examiner* — Robert E Fuller
*Assistant Examiner* — Lamia Quaim
(74) *Attorney, Agent, or Firm* — Jason Sedano; Parker Justiss, P.C.

(57) ABSTRACT

A method that includes deploying an acoustic caliper tool in a borehole, the tool having several axially-spaced acoustic transceivers; obtaining acoustic signal reflection measurements for the transceivers; estimating a distance-to-boundary value for the transceivers based on reflection measurements; calculating a tool inclination angle based on the distance-to-boundary values; and deriving a correction value based on the angle. A system that includes an acoustic caliper tool having several axially-spaced acoustic transceivers to obtain reflection measurements; at least one processor; and at least one memory in communication with the processor, the memory storing instructions that cause the processor to: receive the acoustic signal reflection measurements; estimate a distance-to-boundary value for the transceivers based on the reflection measurements; calculate a tool inclination angle based on the distance-to-boundary values; and derive a correction value based on the angle.

19 Claims, 17 Drawing Sheets

(51) Int. Cl.
*E21B 44/00* (2006.01)
*G01V 11/00* (2006.01)
*G01V 1/50* (2006.01)

(52) U.S. Cl.
CPC ........ G01V 11/005 (2013.01); *G01V 2200/16* (2013.01)

(56) References Cited

U.S. PATENT DOCUMENTS

| | | | |
|---|---|---|---|
| 8,074,511 B2 * | 12/2011 | Huiszoon | E21B 47/082 175/50 |
| 2006/0016592 A1 * | 1/2006 | Wu | E21B 21/08 166/250.07 |
| 2012/0228028 A1 * | 9/2012 | Turner | E21B 17/07 175/56 |
| 2013/0118809 A1 * | 5/2013 | Veeningen | E21B 47/02 175/45 |
| 2015/0000980 A1 | 1/2015 | Williams | |

* cited by examiner

SYSTEMS AND METHODS EMPLOYING AN ACOUSTIC CALIPER TOOL WITH TOOL INCLINATION CORRECTION

CROSS-REFERENCE TO RELATED APPLICATION

This application is the National Stage of, and therefore claims the benefit of, International Application No. PCT/US2015/036566 filed on Jun. 19, 2015, entitled "SYSTEMS AND METHODS EMPLOYING AN ACOUSTIC CALIPER TOOL WITH TOOL INCLINATION CORRECTION," which was published in English under International Publication Number WO 2016/204775 on Dec. 22, 2016. The above application is commonly assigned with this National Stage application and is incorporated herein by reference in its entirety.

BACKGROUND

During oil and gas exploration and production, many types of information are collected and analyzed. The information is used to determine the quantity and quality of hydrocarbons in a reservoir and to develop or modify strategies for hydrocarbon production. Among the options available for collecting relevant information are logging-while-drilling (LWD) tools and logging tools deployed via wireline, slickline, or coiled tubing.

During logging operations, borehole parameters (e.g. size, enlargements, protrusions, etc.) can affect collected measurements and their interpretation. One technique to identify borehole parameters involves using an acoustic caliper tool. Previous acoustic caliper tool designs, while able to measure tool eccentricity in a borehole, fail to account for tool inclination, which also affects collected measurements and their interpretation. While the use of centralizers/stabilizers can reduce tool inclination, using a large number of centralizers/stabilizers with a bottom hole assembly (BHA) may negatively affect rotary torque values and increase mechanical wear on the borehole. Thus, efforts to eliminate or reduce tool inclination can add expense and have negative consequences to downhole operations.

BRIEF DESCRIPTION OF THE DRAWINGS

Accordingly, there are disclosed in the drawings and the following description systems and methods for employing an acoustic caliper tool with tool inclination correction. In the drawings.

Figure 1:
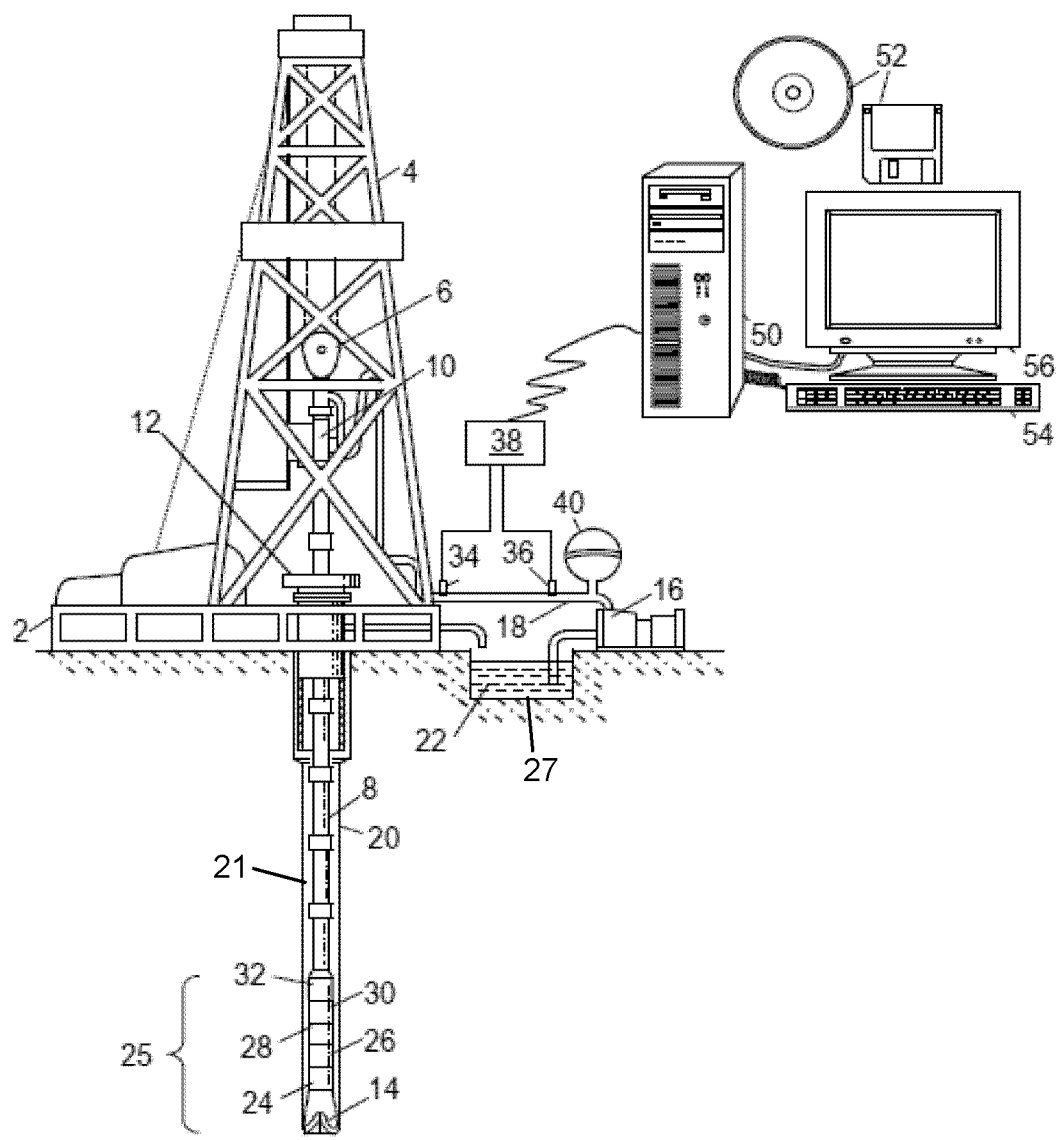
FIG. 1 is a schematic diagram showing an illustrative measurement/logging-while-drilling (MLWD) scenario.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are systems and methods for employing an acoustic caliper tool with tool inclination correction. In different embodiments, the acoustic caliper tool described herein may be part of a bottom hole assembly (BHA) that performs measurement and/or logging-while-drilling (MLWD) operations, or a wireline tool. To identify tool inclination, the acoustic caliper tool employs a plurality of axially-spaced transceivers, where measurements obtained using each transceiver is analyzed to derive separate distance-to-boundary values (i.e., the distance between a given transceiver and the borehole wall). At some axial positions, there can be multiple transceivers (e.g., positioned on opposite sides of the tool or otherwise azimuthally distributed). The distance-to-boundary values obtained by the transceivers can be compared or combined as described herein to identify tool inclination, borehole enlargements, and/or borehole protrusions. The tool inclination values, borehole enlargement values, and/or borehole protrusion values obtained as a function of position can be used to derive a correction value (e.g., a corrected distance-to-boundary value or adjustment) as a function of position. In different embodiments, correction values can be applied to generate or update a borehole dimension log and/or a slowness log.

In at least some embodiments, an example method includes deploying an acoustic caliper tool in a borehole, where the acoustic caliper tool has a plurality of axially-spaced acoustic transceivers. The method also includes obtaining acoustic signal reflection measurements for each of the plurality of axially-spaced acoustic transceivers, and estimating a distance-to-boundary value for each of the plurality of axially-spaced acoustic transceivers based on the acoustic signal reflection measurements. The method also includes calculating a tool inclination angle based on the distance-to-boundary values, and deriving a correction value based on the tool inclination angle. Meanwhile, an example system includes an acoustic caliper tool having a plurality of axially-spaced acoustic transceivers to obtain acoustic signal reflection measurements. The system also includes at least one processor, and at least one memory in communication with the at least one processor. The at least one memory stores instructions that, when executed, cause the at least one processor to receive the acoustic signal reflection measurements, to estimate a distance-to-boundary value for each of the plurality of axially-spaced acoustic transceivers based on the acoustic signal reflection measurements, to calculate a tool inclination angle based on the distance-to-boundary values, and to derive a correction value based on the tool inclination angle. Various acoustic caliper tool options, deployment options, measurement analysis options, and correction value use options are described herein.

The disclosed systems and methods can be best understood in an application context. Accordingly, FIG. 1 shows an illustrative measurement/logging-while-drilling (MLWD) scenario that includes a drilling platform 2 equipped with a derrick 4 that supports a hoist 6. The rig operator drills an oil or gas well using a drill string 8. Specifically, the hoist 6 suspends a top drive 10 that rotates the drill string 8 as it lowers the drill string 8 through a wellhead 12. Connected to the lower end of the drill string 8 is a drill bit 14. The bit 14 is rotated and drilling accomplished by rotating the drill string 8, by use of a downhole motor near the drill bit, or by both methods. Recirculation equipment, including mud pump 16, pumps drilling fluid 22 through supply pipe 18, through the top drive 10, and down through the drill string 8 at high pressures and volumes to emerge through nozzles or jets in the drill bit 14. The drilling fluid 22 then travels back up the hole via an annulus 21 formed between the exterior of the drill string 8 and a borehole 20 wall, through a blowout preventer, and into a retention pit 27 on the surface. On the surface, the drilling fluid 22 is cleaned and then recirculated by mud pump 16. The drilling fluid 22 carries cuttings from the base of the bore to the surface and balances the hydrostatic pressure in the rock formations.

At the lowermost part of drill string 8, a BHA 25 includes thick-walled tubulars called drill collars, which add weight and rigidity to aid the drilling process. The thick walls of these drill collars make them useful for housing instrumentation and MLWD sensors. In different embodiments, the BHA 25 may include an acoustic caliper tool 28 and a control/telemetry module 32. Further, one or more logging tools such as a natural gamma ray detector 24, a resistivity tool 26, and a neutron porosity tool 30 may be included with the BHA 25. Example sensors that can also be included in the BHA 25 include position sensors, orientation sensors, pressure sensors, temperature sensors, vibration sensors, etc. From the various BHA tools and sensors, the control/telemetry module 32 collects data regarding formation properties, the downhole environment, and/or drilling parameters, and stores the data in internal memory. In addition, some or all of the data is transmitted to earth's surface by, e.g., mud pulse telemetry, acoustic telemetry, electromagnetic telemetry, wired telemetry, etc.

In a mud pulse telemetry example, the control/telemetry module 32 modulates a resistance to drilling fluid flow to generate pressure pulses that propagate to earth's surface. Subsequently, one or more pressure transducers 34, 36 (isolated from the noise of the mud pump 16 by a desurger 40) convert the pressure signal into electrical signal(s) for a signal digitizer 38. The digitizer 38 supplies a digital form of the pressure signals to a computer 50 or some other form of a data processing device. Computer 50 operates in accordance with software (which may be stored on information storage media 52) and user input received via an input device 54 to process and decode the received signals. The resulting telemetry data may be further analyzed and processed by computer 50 to generate a display of useful information on a computer monitor 56 or some other form of a display device.

In at least some embodiments, the acoustic caliper tool 28 obtains measurements that are analyzed to identify a tool inclination and related correction values as described herein. For example, the correction values can be applied to a borehole dimension log, a slowness log, or logs related to other tools includes with the BHA 25. In different embodiments, tool inclination analysis and related corrections may involve downhole processing operations, computers at earth's surface, or both.

Figure 2:
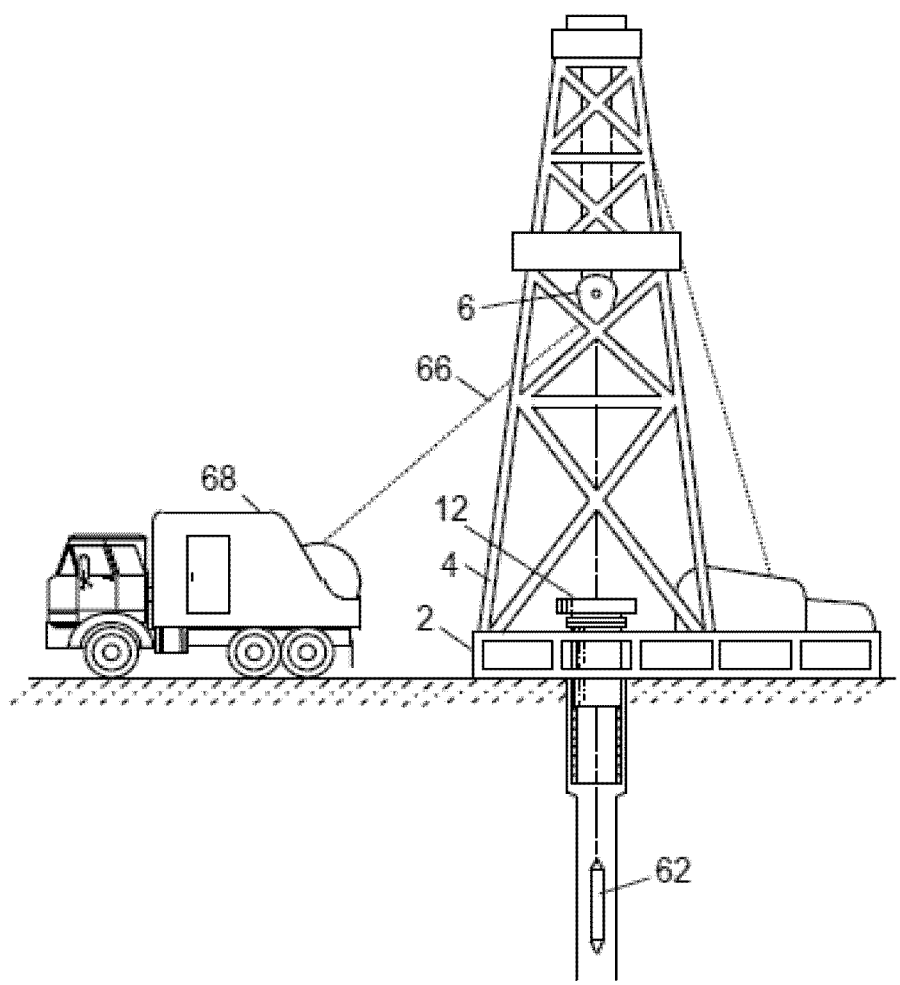
FIG. 2 is a schematic diagram showing an illustrative wireline logging scenario.

At various times during the drilling process, the drill string 8 may be removed from the borehole and replaced with a wireline logging assembly as shown in FIG. 2, which represents a wireline logging scenario. Once the drill string has been removed, logging operations can be conducted using a wireline tool string 62, i.e., a sensing instrument sonde suspended by a cable 66 having conductors for conveying power to the wireline tool string 62 and telemetry between the wireline tool string 62 and earth's surface. In at least some embodiments, the wireline tool string 62 includes an acoustic caliper tool with tool inclination correction as described herein. Other formation property sensors can additionally or alternatively be included to measure formation properties as the wireline tool string 62 moves uphole or downhole. A logging facility 68 collects measurements from the wireline tool string 62 and includes computing facilities for processing and storing the measurements gathered by the logging tool. In at least some embodiments, an acoustic caliper tool included with the wireline tool string 62 obtains measurements that are analyzed to identify a tool inclination and related correction values as described herein. The correction values can be applied to a borehole dimension log, a slowness log, or logs related to other tools includes with the wireline tool string 62. In different embodiments, tool inclination analysis and related corrections may involve downhole processing operations, computers at earth's surface, or both.

Figure 3:
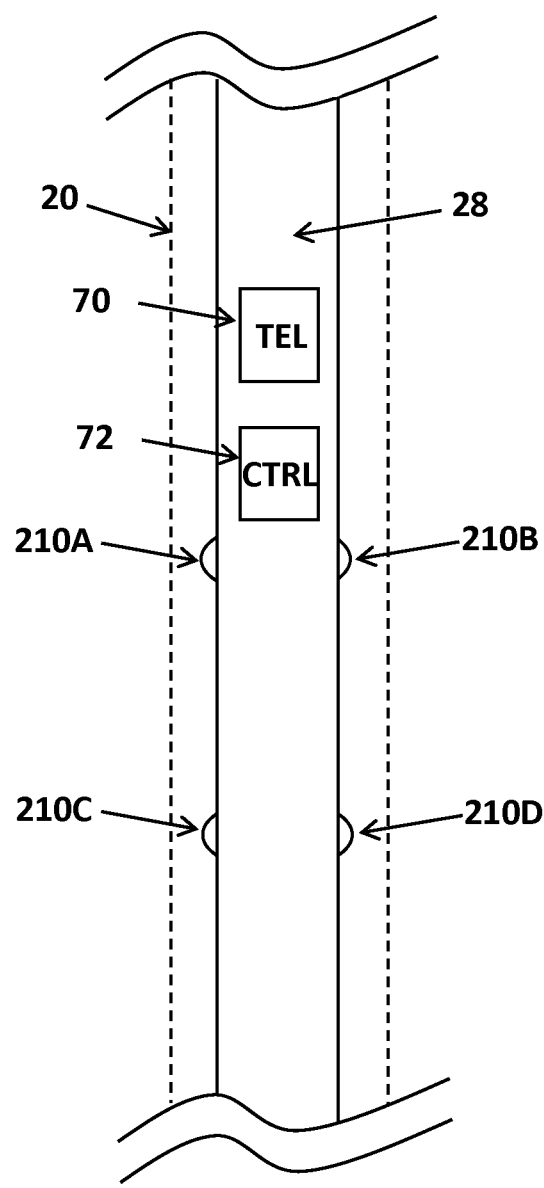
FIG. 3 is a schematic diagram showing an illustrative acoustic caliper tool.

FIG. 3 shows an illustrative MLWD embodiment of acoustic caliper tool 28 in the borehole 20. The wireline tool string 62 of FIG. 2 may include similar components. As shown, the acoustic caliper tool 28 includes a plurality of transceivers 210A-210D, a controller 72, and a telemetry interface 70. More specifically, the telemetry interface 72 enables communications with other downhole tools and/or with equipment at earth's surface. Further, the control unit 72 directs the operations of transceivers 210A-210D in accordance with stored instructions or received commands (e.g., live command received via the telemetry interface 72). In operation, each of the transceivers 210A-210D can be triggered individually to emit an acoustic signal. Further, each of the transceivers 210A-210D can receive acoustic signals. In at least some embodiments, the transceivers 210A-210D are operated to enable travel time analysis of reflected acoustic signals such that a distance-to-boundary value is identified for each transceiver 210. To estimate tool inclination, the distance-to-boundary values for axially-spaced transceivers along one side of the acoustic caliper tool 28 (e.g., transceivers 210A and 210C, or transceivers 210B and 210D) can be used to determine tool inclination. Using distance-to-boundary values for additional transceivers 210 (at different axial positions and/or azimuthal positions) can improve tool inclination accuracy and account for anomalies such as borehole enlargements and protrusions. In at least some embodiments, the controller 72 may process obtained measurements to determine distance-to-boundary values, tool inclination, and/or correction values.

Further, in at least some embodiments, the acoustic caliper tool 28 may perform acoustic logging operations to derive slowness logs. In such case, one of the transceivers (e.g., transceiver 210A) operates as a transmitter, while the other transceivers (e.g., 210B-210D) operate as receivers. Alternatively, a separate transmitter may be included with the acoustic caliper tool 28 to enable acoustic logging operations from which slowness logs are obtains. Depending on the frequency used, obtained slowness logs may provide information regarding the formation, mud cake thickness, and/or borehole fluids.

Once borehole dimension measurements, tool inclination measurements, correction values, or acoustic logging measurements are obtained, the controller 72 may convey the measurements or derived values to the telemetry interface 70 to enable the measurements or derived values to be communicated to another downhole component in a BHA or wireline tool string, and/or to earth's surface. In at least some embodiments, the contemplated operating frequencies for the acoustic caliper tool 28 are in two ranges: 0-25 KHz to measure slowness, and 100 KHz-1 MHz to measure borehole size and shape. The operating frequency used may be selected and optimized for each particular target formation and targeted measurements. In one scenario for measuring formation slowness, a lower frequency range is preferred while for borehole size and shape (a deeper depth of investigation) measurements, a higher frequency range is preferred (that provides better reflection at the borehole surface).

In at least some embodiments, the borehole dimension measurements and/or acoustic logging measurements obtained using the acoustic caliper tool 28 are associated with a position and tool orientation to generate a log or image of the borehole or surrounding formation. The log or image may be stored and ultimately displayed for viewing by a user. For example, in response to information provided in a displayed log or image, a user may decide to adjust drilling parameters or drilling mud options. Further, the log or image may be used to identity formation characteristics, bed boundaries, or other information.

Figure 4:
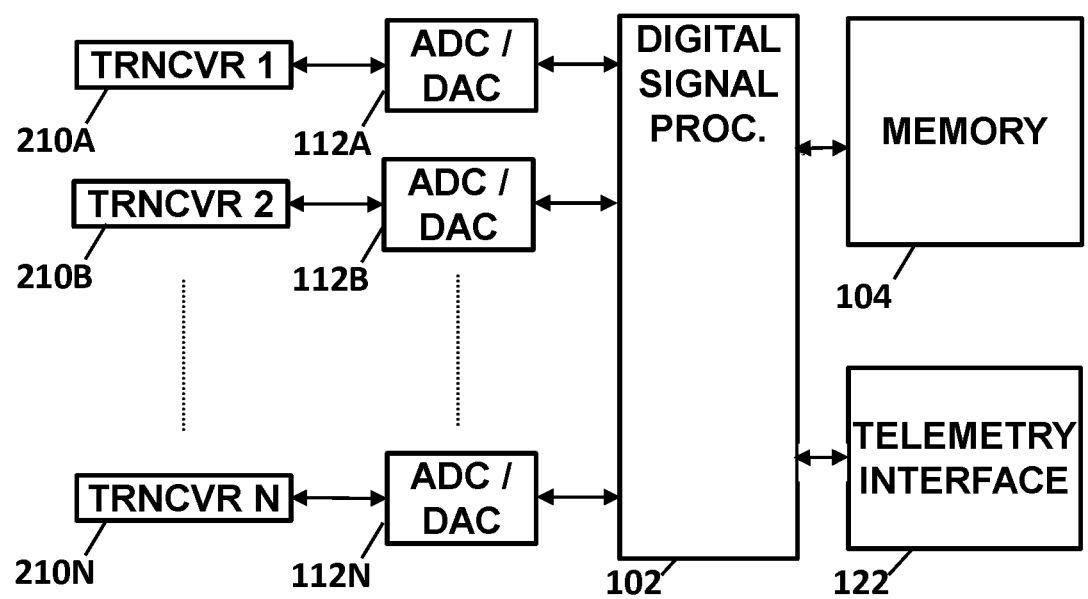
FIG. 4 is a block diagram showing illustrative acoustic caliper tool electronics.

FIG. 4 is a block diagram of illustrative electronics associated with an acoustic caliper tool (e.g., tool 28). As shown, the electronics include a digital signal processor 102 that may operate as a controller (e.g., controller 72 of FIG. 3) by executing software or instructions stored in a memory 104. For example, the instructions may cause the processor 102 to direct firing of the transceivers 210A-210N, to analyze measurements obtained in response to each firing, to store obtained measurements or derived values, and to communicate the measurements or derived values to a telemetry interface 122. As needed, an analog-to-digital converter (ADC) and/or digital-to-analog converter (DAC) 112A-112N may be employed between the processor 102 and each transceiver 210A-210N.

In accordance with at least some embodiments, the processor 102 executes software to derive a velocity or slowness log or a distance-to-boundary log as a function of position. Specifically, the processor 102 may execute software to estimate a distance-to-boundary value for each transceiver based on acoustic signal reflection measurements. Further, the processor 102 may execute software to calculate a tool inclination angle based on the distance-to-boundary values, or to derive a correction value based on the tool inclination angle. Additionally, the processor 102 may execute software to derive a velocity or slowness log from obtained measurements. In at least some embodiments, the processor 102 executes software to convey obtained measurements or derived values to telemetry interface 122. The telemetry interface 122 communicates the measurements or derived values, for example, to an uphole processor or to a surface processing facility. The telemetry interface 122 may also enable new commands or instructions to be provided to the processor 102 or memory 104 (e.g., activating tool components or changing operating parameters).

Figure 5A:
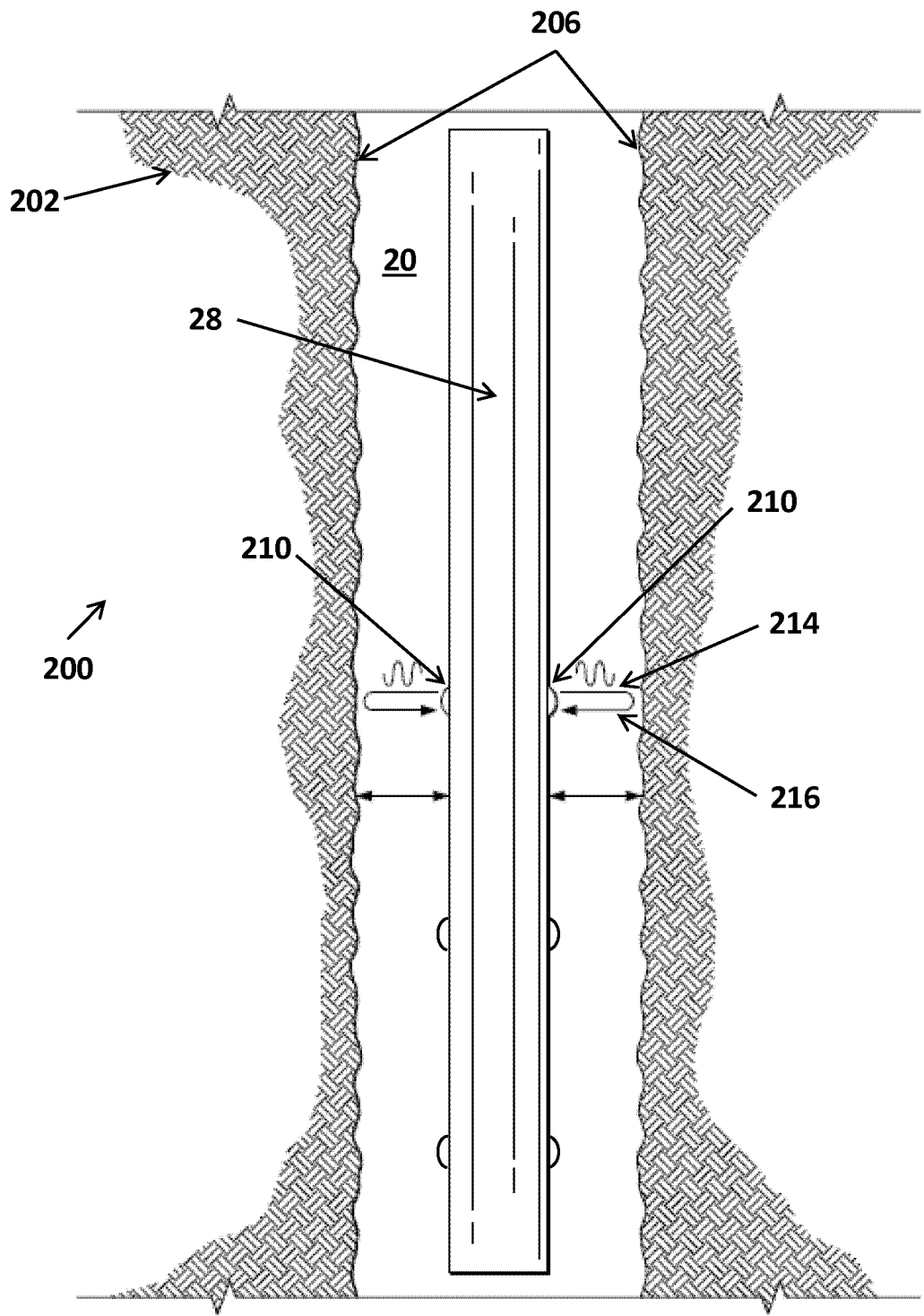
FIGS. 5A and 5B are schematic diagrams showing transceiver orientations and the signals emanating from those transceivers.
Figure 5B:
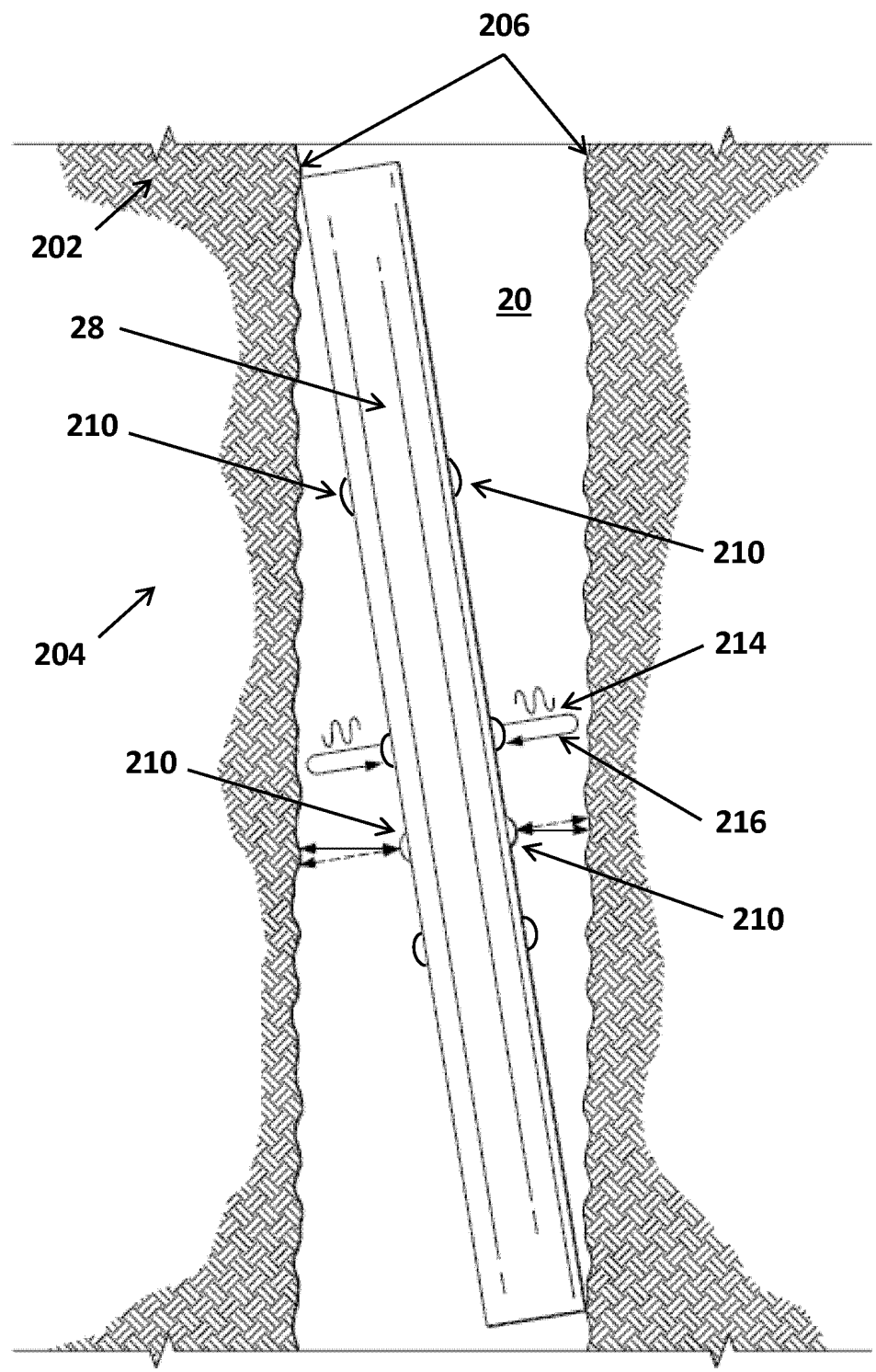

FIGS. 5A and 5B are schematic diagrams showing acoustic caliper tool scenarios with and without tool inclination. In scenario 200 of FIG. 5A, an acoustic caliper tool 28 without tool inclination is deployed in a borehole 20 that passes through a formation 202. The acoustic caliper tool 28 includes three sets of transceivers 210 arranged in pairs, where each pair is axially-spaced along the acoustic caliper tool 28. Alternative transceiver arrangements may include more or less transceivers. Further, each axial position may be associated with more than two transceivers. As desired, each transceiver 210 may transmit an acoustic signal 214 and receive a corresponding reflection 216 from which an estimated distance between the given transceiver and the borehole wall 206 can be estimated. Specifically, transmitted signals 214 travel outward from transceivers 210 at one axial position and the reflections 216 travel back from the borehole wall 206. The travel times between when the signals 214 are emitted and when the reflections 216 are received are recorded and used to determine distance-to-boundary values. If the acoustic caliper tool 28 has no tool inclination as in scenario 200, the distance-to-boundary values for transceivers 210 at one axial position are sufficient to derive a borehole dimension log.

In scenario 204 of FIG. 5B, an acoustic caliper tool 28 with tool inclination is deployed in the borehole 20. Again, the acoustic caliper tool 28 includes three sets of transceivers 210 arranged in pairs, where each pair is axially-spaced along the acoustic caliper tool 28. As desired, each transceiver 210 may transmit an acoustic signal 214 and receive a corresponding reflection 216 from which an estimated distance between the given transceiver and the borehole wall 206 can be estimated. Specifically, transmitted signals 214 travel outward from transceivers 210 at one axial position and the reflections 216 travel back from the borehole wall 206. The travel times between when the signals 214 are emitted and when the reflection signals 216 are received are recorded and used to determine distance-to-boundary values. Because the acoustic caliper tool 28 is inclined or tilted in scenario 204, the distance-to-boundary values for transceivers 210 at one axial position include an error due to the tool inclination. In accordance with at least some embodiments, a corrected distance-to-boundary value can be determined by first determining the tool inclination as described herein.

With several transceivers working in close proximity to each other as may be the case in scenarios 200 and 204, it may be necessary to prevent the signals of each transceiver 210 from interfering with each other. Without limitation, this may be accomplished using different frequencies for each transceiver, applying acoustic isolation materials in the area around each transceiver, or varying the timing of measurements related to each transceiver. Further, in some embodiments, the operating frequency range of the transceivers 210 may also enable acoustic logging operations with sensitivity to various fluids, mud compositions, or hydrocarbon products that may be present in a borehole.

Figure 6:
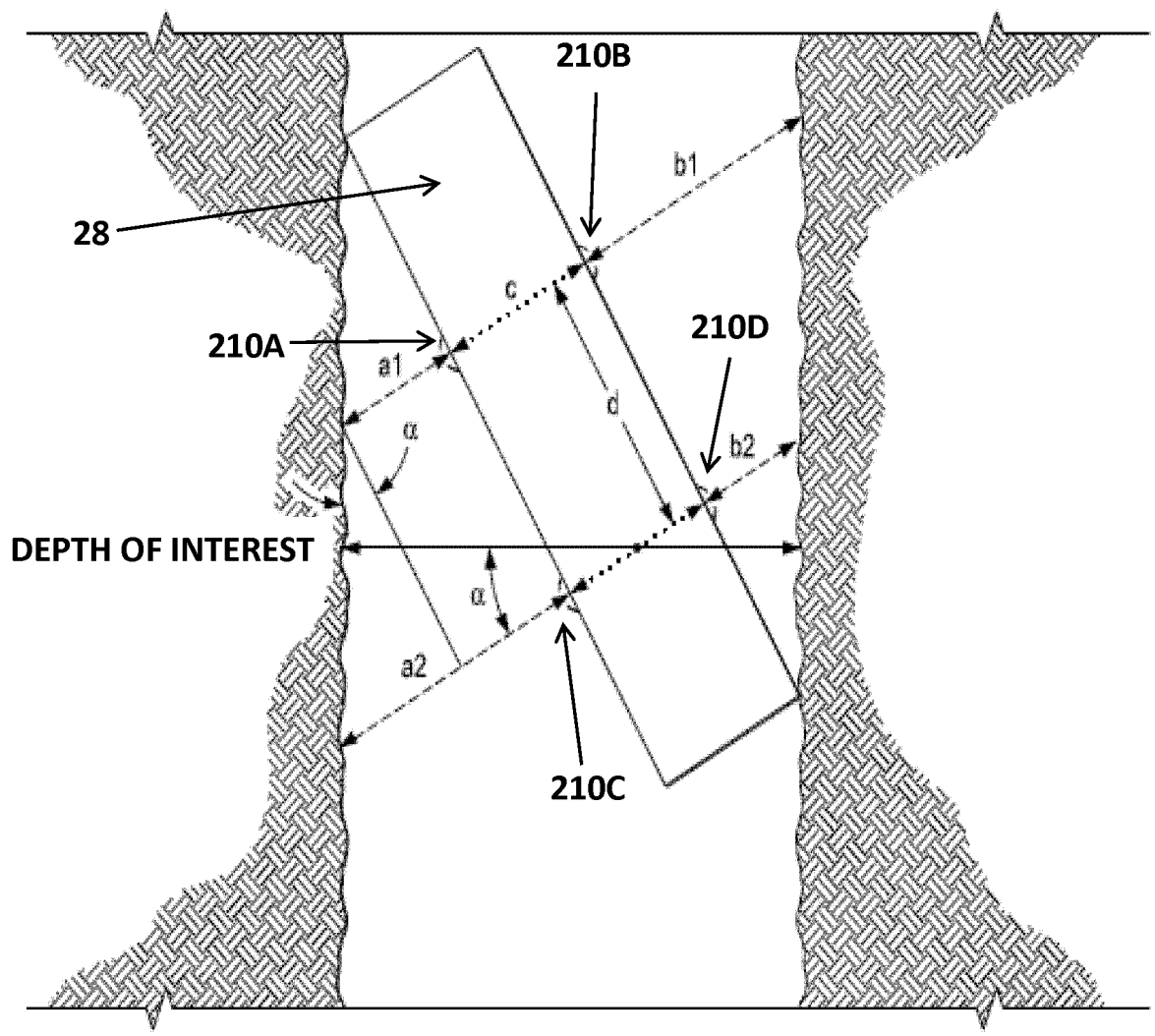
FIG. 6 is a schematic diagram showing tool inclination analysis using axially-spaced transceivers.

FIG. 6 is a schematic diagram showing tool inclination analysis using axially-spaced of transceivers as described herein. In FIG. 6, various parameters are represented including the distance-to boundary value between transceiver 210A and the borehole wall ("a1"), the distance-to boundary value between transceiver 210B and the borehole wall ("b1"), the distance-to boundary value between transceiver 210C and the borehole wall ("a2"), the distance-to boundary value between transceiver 210D and the borehole wall ("b2"), the tool inclination angle ("a"), the distance between axially-spaced transceivers ("d"), and the width of the acoustic caliper tool ("c").

In at least some embodiments, the tool inclination angle α can be calculated as follows:

$$\alpha = \tan^{-1}\frac{(a2 - a1)}{d} \quad \text{(Equation 1)}$$

From Equation 1, it may be noted that as few as two axially-spaced transceivers along one side of an acoustic caliper tool are needed to measure the inclination angle. Using additional axially-spaced transceivers and/or rotating the acoustic caliper to calculate the tool inclination angle is possible and decreases the dependence of the inclination angle calculation on a single value. Once the tool inclination angle is calculated, corrected distance-to-boundary values for a2 and b2 can be estimated as:

$$a2\_corrected = (a_2 + c/2) \times \cos\alpha - c/2 \quad \text{(Equation 2)}$$

$$b2\_corrected = (b_2 + c/2) \times \cos\alpha - c/2 \quad \text{(Equation 3)}$$

Corrected distance-to-boundary values for a1 and b1 can similarly be estimated. The corrected distance-to-boundary values can be used to derive or update a borehole dimension log, a slowness log, or other values. It should be appreciated that the calculations for equations 1-3 or similar equations can be repeated for each position along a borehole to acquire a tool inclination log as a function of position, corrected distance-to-boundary values as a function of position, and/or correction values as a function of position.

In different embodiments, tool inclination angle measurement, distance-to-boundary values, or correction values may be based on a single set of measurements at one position, or may be an average of multiple measurements taken at one position. As desired, tool inclination angle measurements, distance-to-boundary values, or correction values can be averaged over multiple positions to "smooth out" the results and thus reduce the influence of anomalies.

Figure 7A:
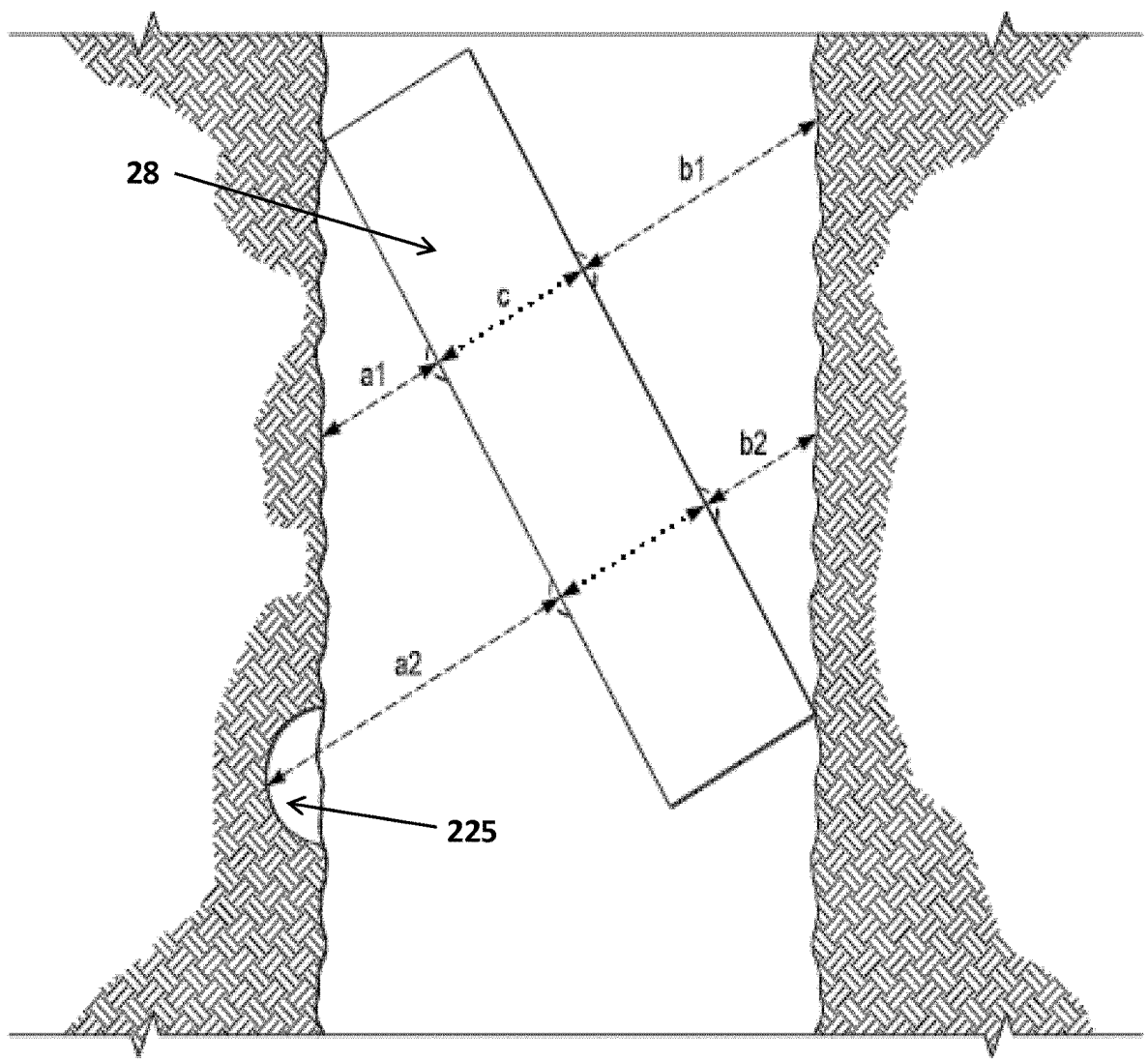
FIGS. 7A, 7B, 7C, and 7D are schematic diagrams showing detection of various combinations of borehole enlargements and protrusions.
Figure 7B:
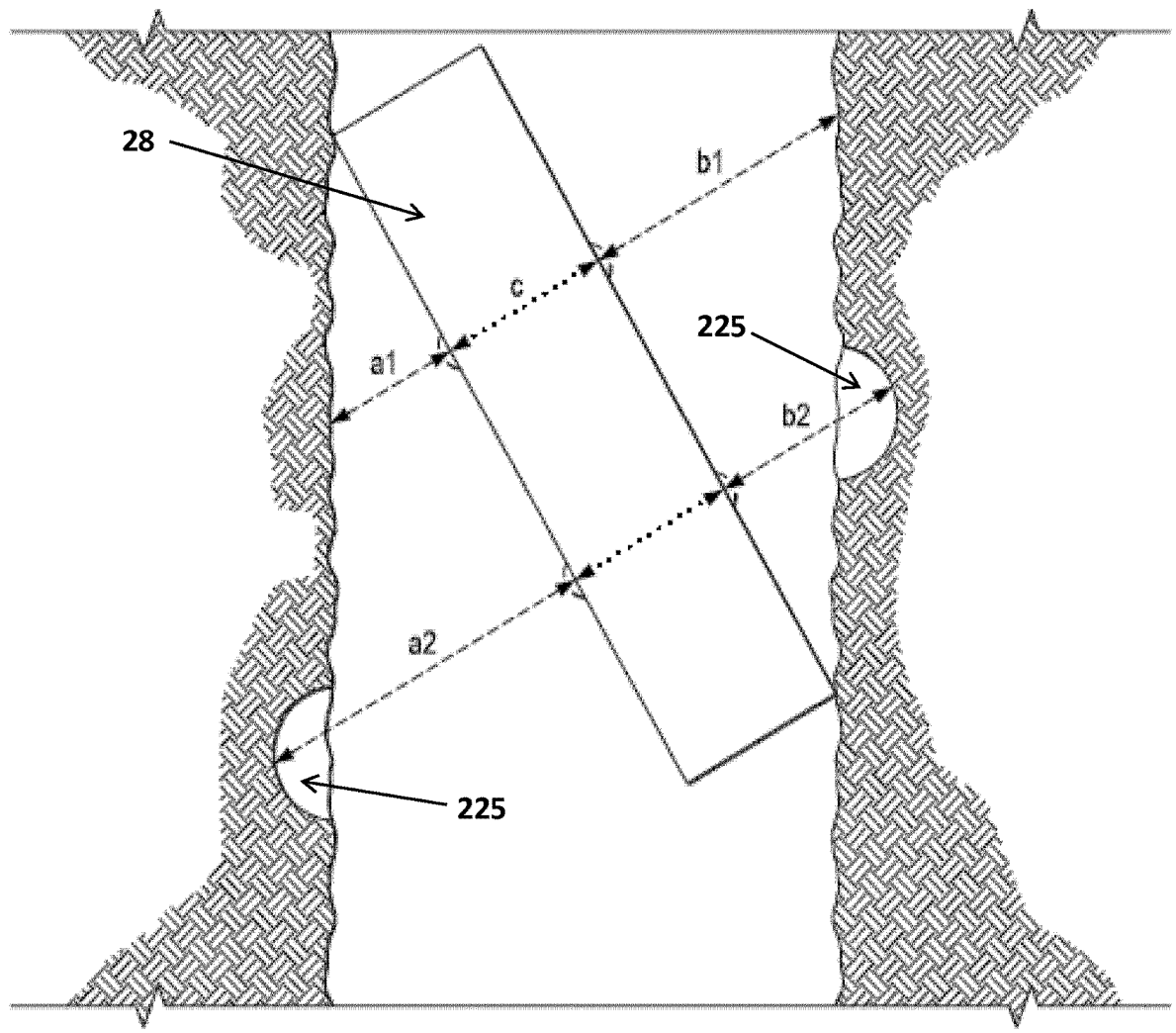
Figure 7C:
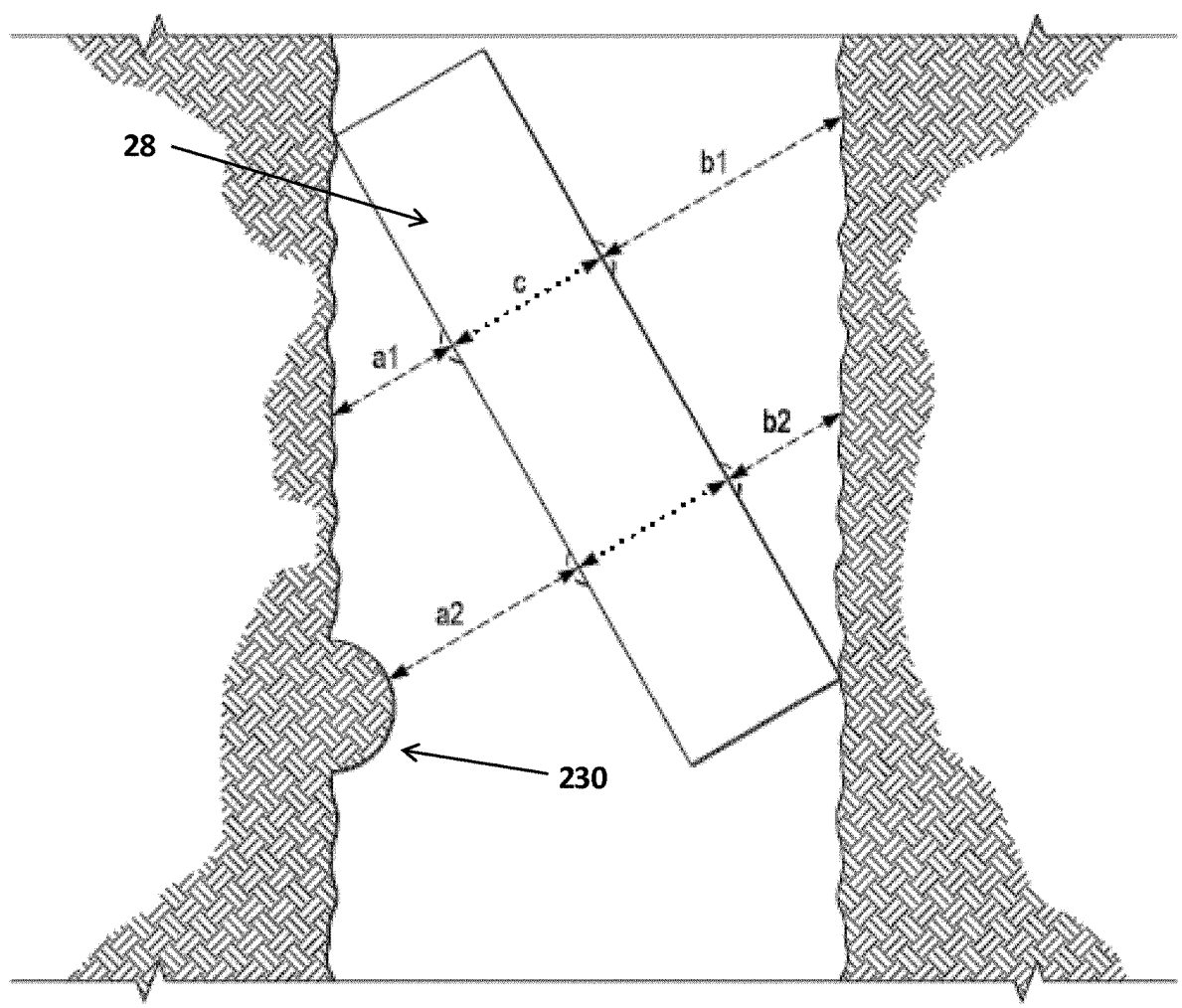
Figure 7D:
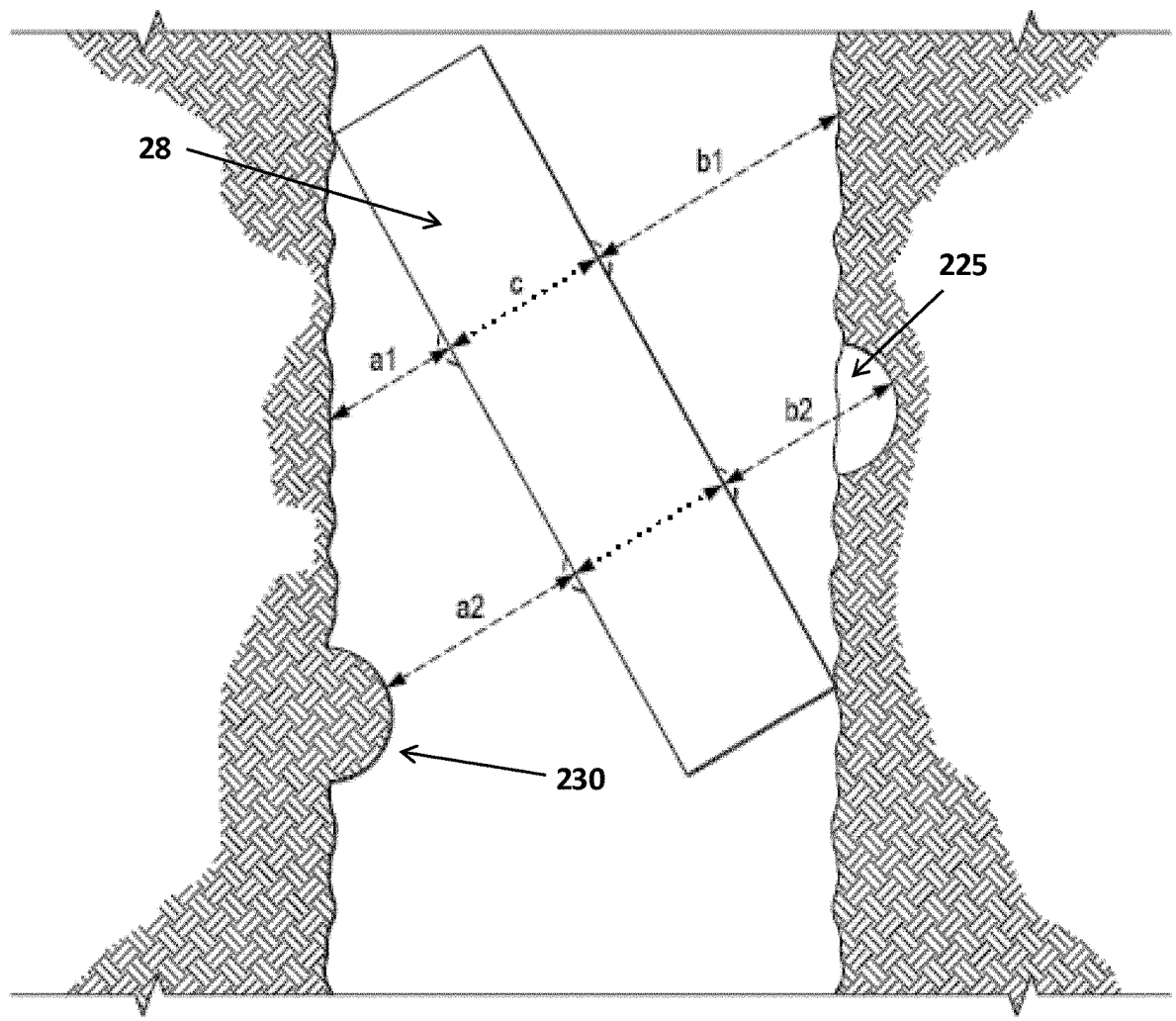

Example anomalies include borehole enlargements and borehole protrusions. FIGS. 7A-7D are schematic diagrams showing various borehole enlargements or protrusion scenarios. FIG. 7A shows a scenario involving a borehole enlargement 225 along one side of a borehole. Meanwhile, FIG. 7B shows a scenario involving two borehole enlargements 225 along opposite sides of a borehole. FIG. 7C shows a scenario involving a borehole protrusion 230 along one side of a borehole. FIG. 7D shows a scenario involving a borehole enlargement 225 and a borehole protrusion 230 along opposite sides of a borehole. Such enlargements and protrusions may vary and result from drilling actions, partial collapse of the borehole, coagulants of mud or detritus debris, and/or other conditions present in the borehole.

To detect borehole enlargement or protrusions, the following technique for an acoustic caliper tool with axially-spaced transceivers may be employed. In at least some embodiments, borehole enlargements can be detected as an increase in the sum (a2+b2) compared to the sum (a1+b1) or compared to the sum (a2+b2) at a different position (see FIGS. 7A and 7B). Meanwhile, when there are borehole protrusions as in FIG. 7C, a reduction in the sum (a2+b2) will be observed compared to the sum (a1+b1) or compared to the sum (a2+b2) at a different position. FIG. 7D demonstrates the case where the sums (a1+b1) and (a2+b2) are equal due to a particular borehole enlargement and protrusion arrangements. In this case, the analysis technique is unable to discern the borehole enlargement and protrusion, but the final borehole diameter recorded will still be accurate.

In at least some embodiments, tool inclination angle or changes in tool inclination angle can be correlated with a "stick-slip" condition. For example, detecting an increasing tool inclination angle over time can be an early indicator of the stick-slip condition. Detecting the stick-slip condition early allows a timely response from drill rig operators to reduce the top drive velocity of the drill string, which can prevent the buildup torque on the drill string that causes torsional buckling of the drill string.

Figure 8A:
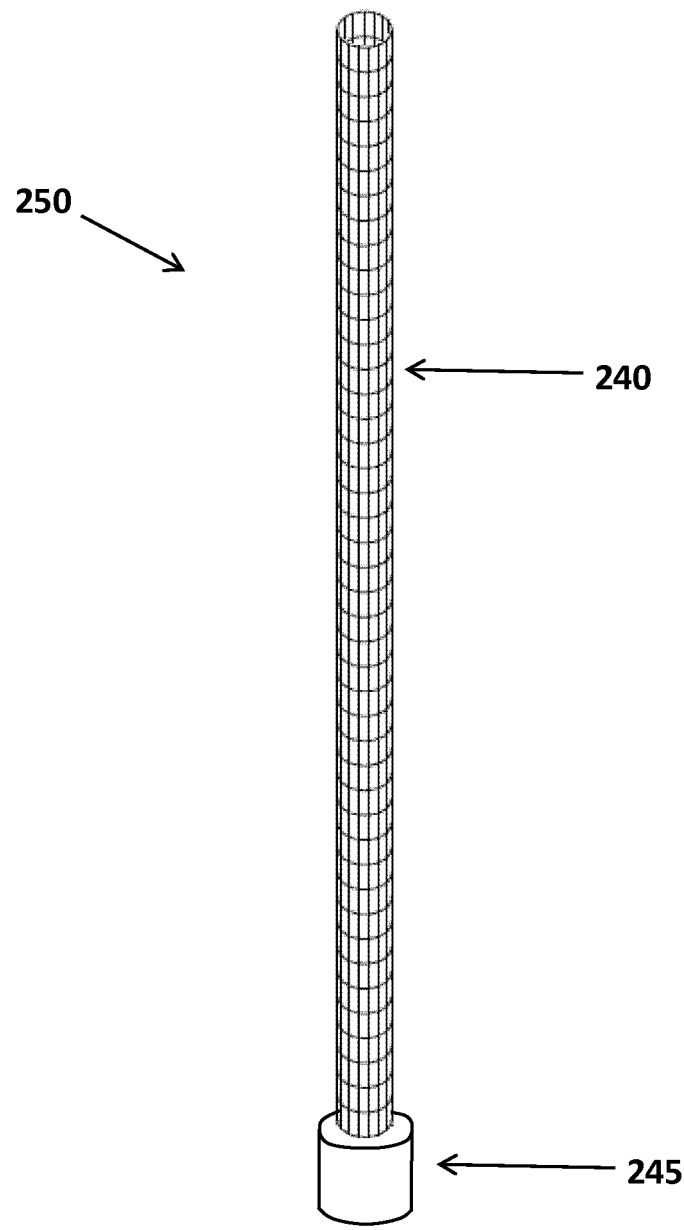
FIGS. 8A, 8B, and 8C are schematic diagrams of an illustrative stick-slip condition.
Figure 8B:
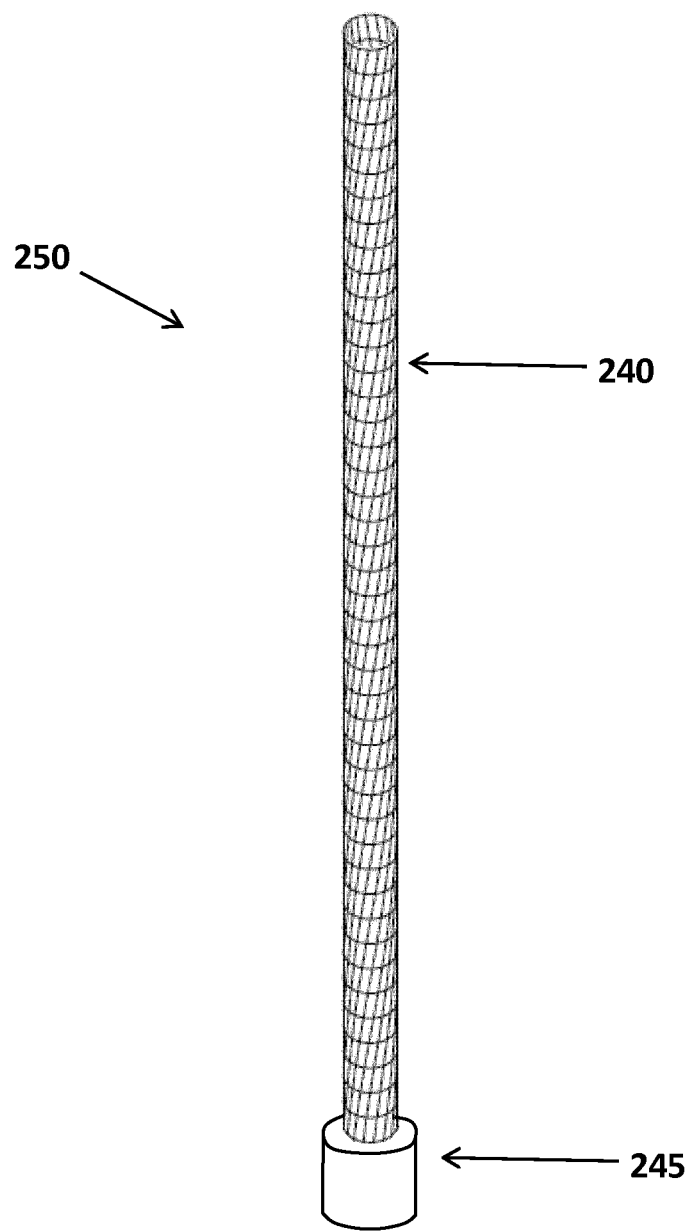
Figure 8C:
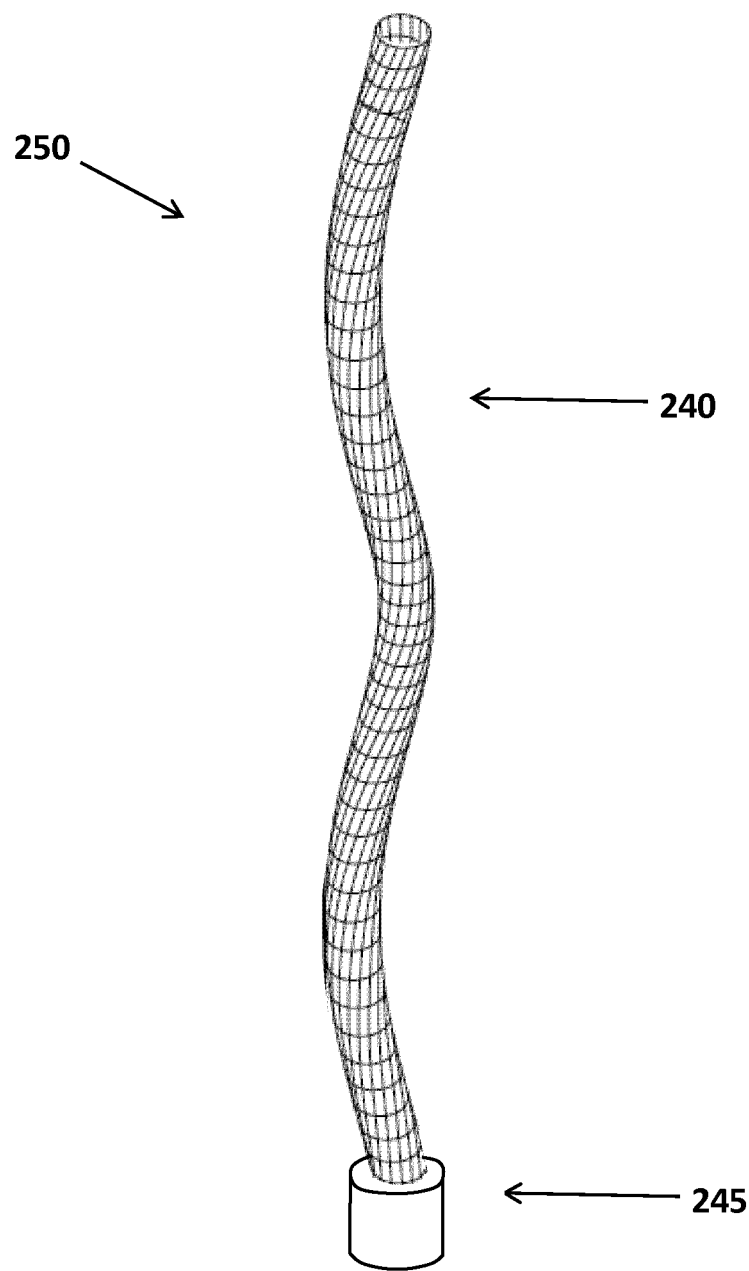

FIGS. 8A, 8B, and 8C are schematic diagrams of an illustrative stick-slip condition. As a preamble, stick-slip is characterized by the absorption and release of energy as a function of the differences between static and dynamic friction. When stick-slip takes place at the end of a long drill string, the phenomenon will produce accumulation and release of energy stored as several turns of twist in the drill string. In the slip or release phase, the string spins out of control and creates destructive vibrations. Stick-slip occurring where the drill bit contacts rock has the potential to create the longest stick and most violent slip periods. Consequently, stick-slip initiated at the rock-cutting interface is highly feared and is responsible for most downhole tool and tool joint overload failures in the industry. Stick-slip can also be produced by the friction between the borehole wall and the drill string itself. Stick-slip can easily induce harmonic oscillations, which will appear as such on downhole recordings. These are self-excited oscillations in string rotation, but with stable torsion at the bit. Harmonic oscillations of this kind can be observed for example in a clockwork spring. For minor variations of stick-slip and self-excited harmonics, the destructive capacity is minimal. But the variations in string rotation can pose challenges to the directional steering systems that rely on a relatively steady rotation for their guidance systems to work. Cutter-induced stick-slip can occur in-between other, less harmful, stick-slip effects and abrupt loads can trigger heavy stick-slip spontaneously. Such abrupt loads may derive from sea swells causing heave on a drillship or from friction causing the bit to advance in leaps in deviated boreholes.

FIG. 8A shows a downhole environment 250 without the stick-slip phenomena present, such as when a drill string 240 employing a drill bit 245 is at rest and not under any significant torque. The drill string is shown in a quiescent state without twisting or torsional forces. FIG. 8B shows the same environment 250 with the drill string 240 and drill bit 245 under rotational forces including torque and experiencing some stick-slip rotational conditions. FIG. 8C shown the same downhole environment 250 with the drill string 240 and drill bit 245 under significant stick-slip conditions, to the point of causing parts failure, inaccurate drilling, and loss of control of the drilling process.

In at least some embodiments, tool inclination angle monitoring as a function of time using an acoustic caliper tool as described herein can be used to identify or predict a stick-slip condition and to direct changes to drilling operations. As an example, if a tool inclination angle or rate of change is greater than a predetermined threshold, the surface operator may be alerted to a stick-slip condition and could drill string RPM or otherwise alter drilling to reduce the likelihood of destructive conditions.

Figure 9:
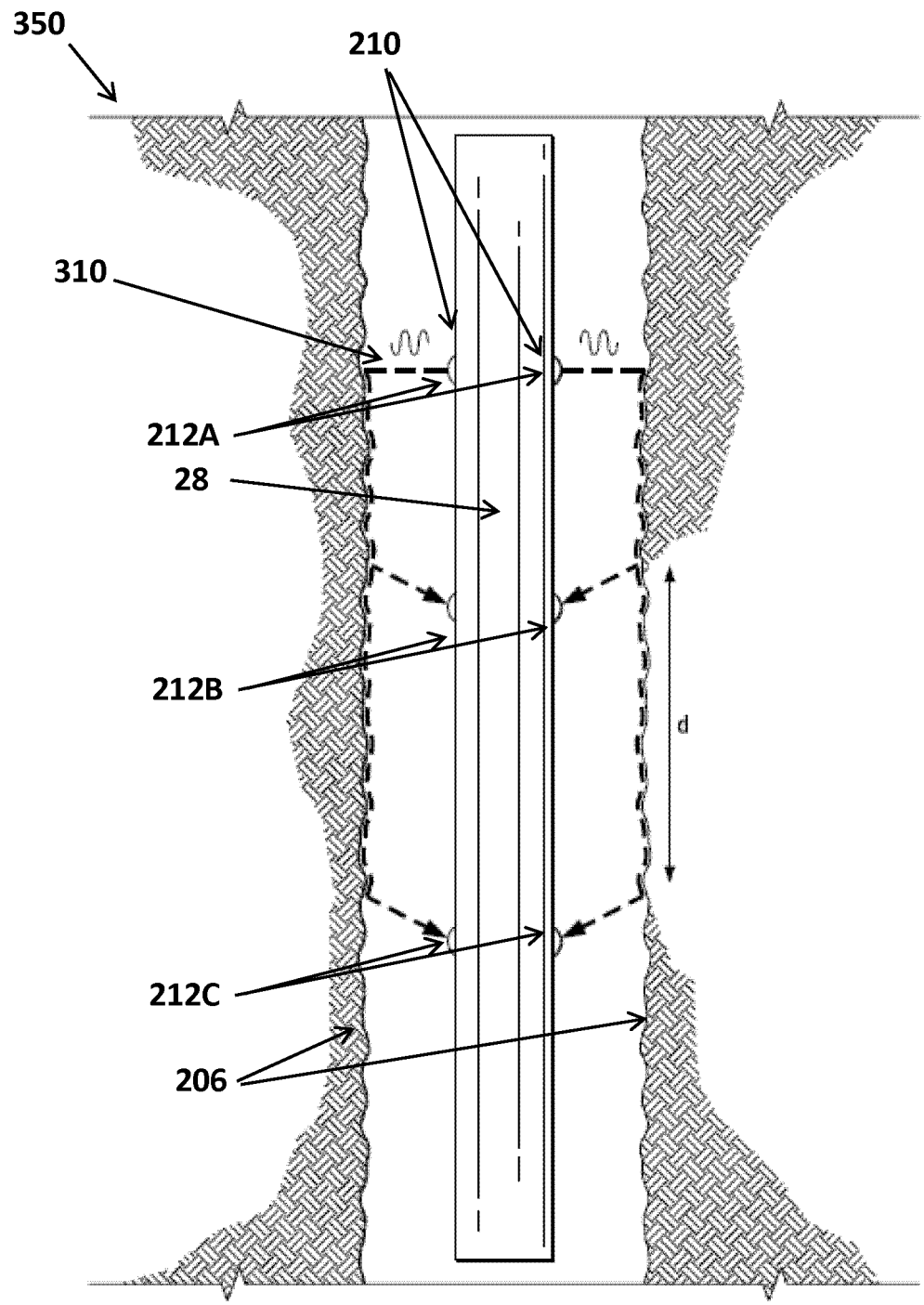
FIG. 9 is a schematic diagram of using multiple transceiver arrays to measure slowness.

As previously mentioned, an acoustic caliper tool can be used obtain acoustic slowness logs in addition to or instead of borehole dimension logs. FIG. 9 is a schematic diagram showing use of multiple transceivers to measure slowness in a downhole environment 350. In FIG. 9, one or more acoustic signals 310 sent out from a first array 212A are not only are reflected back to the transceivers for caliper measurements, but also propagate through the borehole fluid, the borehole wall interface, and/or the surrounding formation. The acoustic signals 310 traveling along the borehole walls 206 are received by transceivers of the middle array 212B and bottom array 212C transceivers. By comparing the difference in arrival time between the arrays, and knowing the difference in travel distance changes between them, the surface layer slowness can be derived as:

compressional wave travel time (DTC)=Δt/Δs    (Equation 4)

Figure 10:
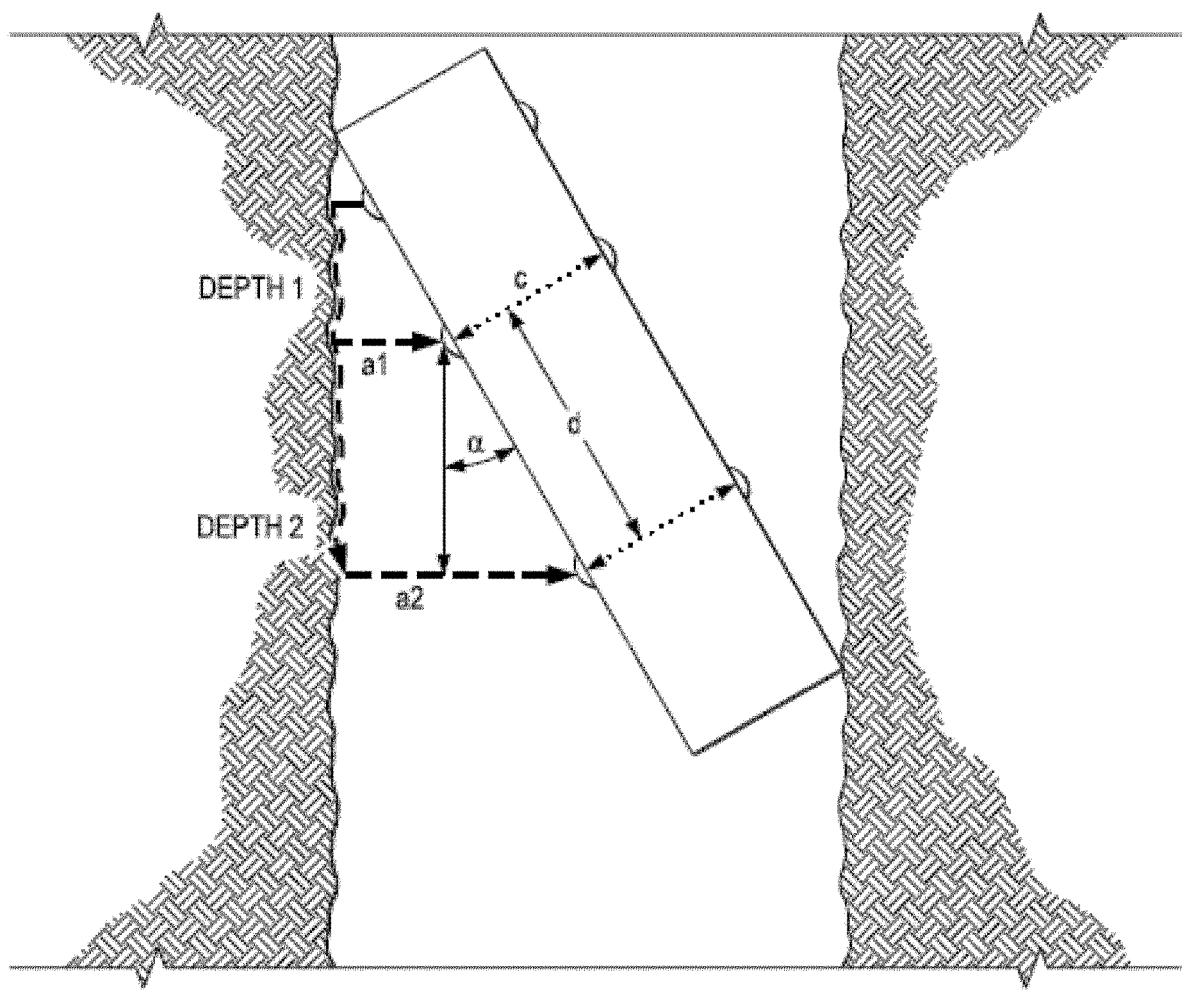
FIG. 10 is a schematic diagram showing a slowness calculation for an inclined tool.

FIG. 10 is a schematic showing a slowness calculation for an inclined tool. Notice that by identifying the inclination angle α as described previously, a more accurate DTC calculation is possible because the distance the wave travels along the top layer of the formation before moving back towards the transceiver depends on the inclination angle as given in Equation 5:

Δs=(a2+d2)−a1=(a2+d1×cos α)−a1    (Equation 5)

One benefit of obtaining this slowness measurement (even when the tool is inclined) is that it can be used for cementing evaluation as a tool is tripping in.

In at least some embodiments, an arrangement of more than two arrays or transceivers are employed to send acoustic signals at different carrier frequencies (200 KHz-500 KHz). The benefit of having more than 2 arrays not only increases accuracy but also allows conducting slowness measurements right at the surface layer of the formation (this is due to the effect that wavelengths of ultrasonic signal are short and the Depth of Investigation (DOI) is effectively 1 wavelength deep into the formation). In at least some embodiments, use of different frequencies allows for mud cake detection and/or mud invasion detection.

Figure 11:
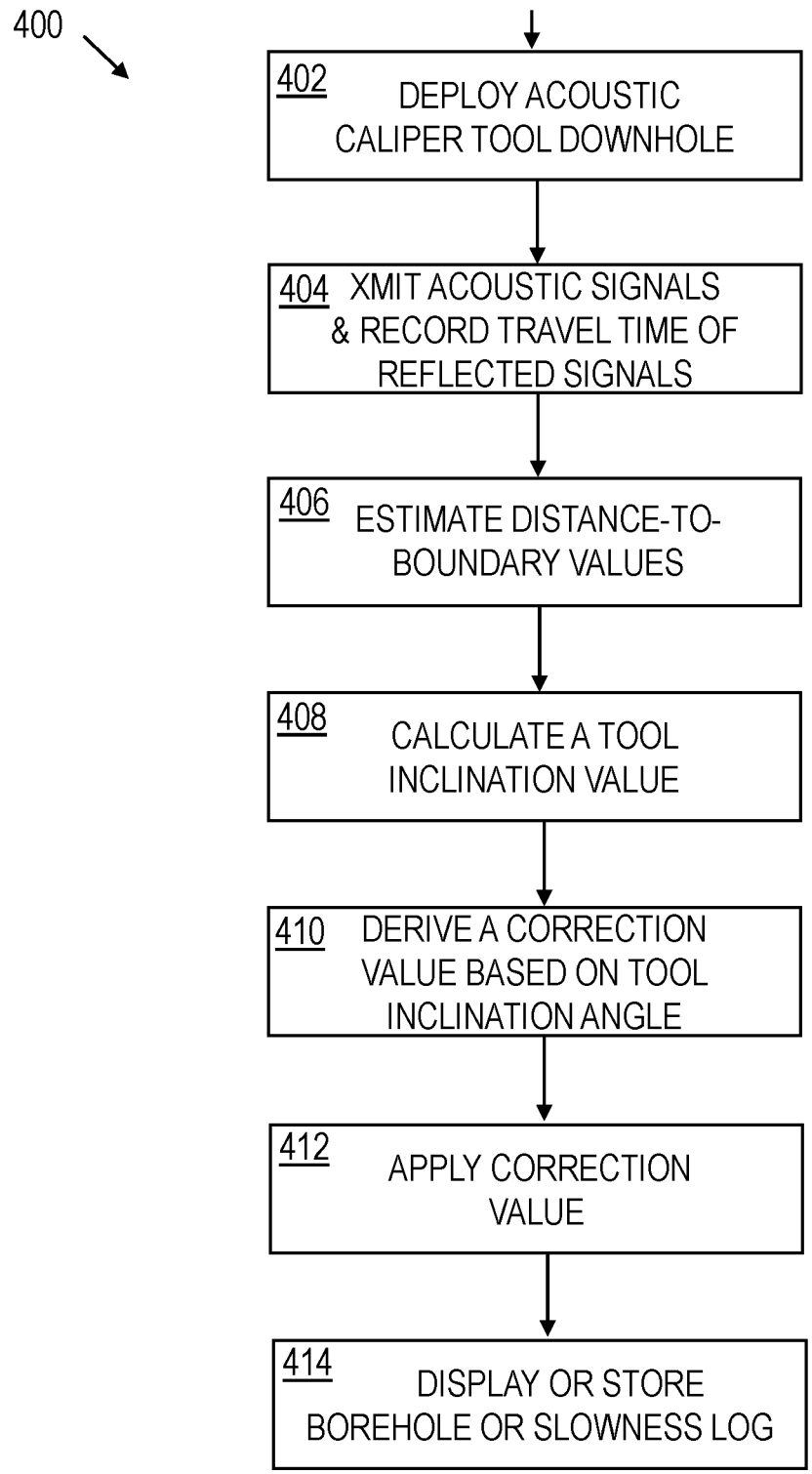
FIG. 11 is a flowchart of an illustrative method for correcting tool inclination effects.

FIG. 11 is a flowchart of an illustrative method 400 for correcting tool inclination effects. The method 400 may be performed for each of a plurality of positions in a borehole. While some operations of method 400 are performed downhole, other may be performed either downhole or at earth's surface. At block 402, an acoustic caliper tool is deployed downhole, where the acoustic caliper tool includes axially-spaced transceivers. For example, an acoustic caliper tool may be deployed as a part of a BHA or via wireline, slickline, or coiled tubing. At block 404, the axially-spaced transceivers transmit acoustic signals that travel outward to the borehole walls and are reflected. The travel time of the reflected signals are recorded. At block 406, an analysis is performed on the recorded travel time data to estimate distance-to-boundary values for each transceiver. At block 408, a tool inclination value is calculated based on the estimated distance-to-boundary values (see e.g., equation 1). At block 410, a correction value is derived based on the tool inclination value. For example, the correction value may correspond to corrected distance-to-boundary values or other correction values (e.g., borehole diameter values, slowness values, a borehole protrusion value, a borehole enlargement value). At block 412, the correction value is applied to generate or update a log (e.g., a borehole dimension log, a slowness log). At block 414, a log of formation parameter values, borehole parameters values, or slowness values based on the correction values is displayed or stored. The operator may use the displayed information to make drilling decisions and/or to plan subsequent well completion operations. In a related method, a slip-stick condition can be detected based on the tool inclination value calculated at block 408. For example, the tool inclination value or a rate of change can be compared to a threshold to identify a stick-slip condition.

Embodiments disclosed herein include:

A: a method that comprises: deploying an acoustic caliper tool in a borehole, the acoustic caliper tool having a plurality of axially-spaced acoustic transceivers; obtaining acoustic signal reflection measurements for each of the plurality of axially-spaced acoustic transceivers; estimating a distance-to-boundary value for each of the plurality of axially-spaced acoustic transceivers based on the acoustic signal reflection measurements; calculating a tool inclination angle based on the distance-to-boundary values; and deriving a correction value based on the tool inclination angle.

B: a system that comprises: an acoustic caliper tool having a plurality of axially-spaced acoustic transceivers to obtain acoustic signal reflection measurements; at least one processor; and at least one memory in communication with the at least one processor, the at least one memory storing instructions that, when executed, cause the at least one processor to: receive the acoustic signal reflection measurements; estimate a distance-to-boundary value for each of the plurality of axially-spaced acoustic transceivers based on the acoustic signal reflection measurements; calculate a tool inclination angle based on the distance-to-boundary values; and derive a correction value based on the tool inclination angle.

Each of embodiments A and B may have one or more of the following additional elements in any combination: Element 1: further comprising applying the correction value to a borehole dimension log. Element 2: further comprising applying the correction value to a slowness log. Element 3: further comprising: summing distance-to-boundary values associated with a first axial position along the acoustic caliper tool; summing distance-to-boundary values associated with a second axial position along the acoustic caliper tool; and comparing the summed distance-to-boundary values to identify a borehole enlargement or borehole protrusion. Element 4: further comprising: summing distance-to-boundary values associated with different positions along the borehole to establish an average borehole size; summing distance-to-boundary values associated with a subsequent position along the borehole to establish a subsequent borehole size; and comparing the subsequent borehole size and the average borehole size to identify a borehole enlargement or borehole protrusion at the subsequent position. Element 5: further comprising applying the correction value to a borehole protrusion value. Element 6: further comprising obtaining acoustic signal propagation measurements using the plurality of axially-spaced acoustic transceivers and deriving the slowness log based on the acoustic signal propagation measurements and the correction value. Element 7: wherein obtaining the acoustic signal propagation measurements involves emitting an acoustic signal with varying frequencies from 0-1 MHz, and wherein the slowness log is interpreted to include mud cake or mud invasion information. Element 8: further comprising comparing the tool inclination angle to a threshold associated with a stick-slip condition. Element 9: further comprising changing a drilling parameter in response to the comparison. Element 10: wherein the instructions further cause the processor to apply the correction value to a borehole dimension log. Element 11: wherein the instructions further cause the processor to apply the correction value to the slowness log. Element 12: wherein the instructions further cause the processor to: sum distance-to-boundary values associated with a first axial position along the acoustic caliper tool; sum distance-to-boundary values associated with a second axial position along the acoustic caliper tool; and compare the summed distance-to-boundary values to identify a borehole enlargement or borehole protrusion. Element 13: wherein the instructions further cause the processor to: sum distance-to-boundary values associated with different positions along the borehole to establish an average borehole size; sum distance-to-boundary values associated with a subsequent position along the borehole to establish a subsequent borehole size; and compare the subsequent borehole size and the average borehole size to identify a borehole enlargement or borehole protrusion at the subsequent position. Element 14: wherein the acoustic caliper tool obtains acoustic signal propagation measurements using the plurality of axially-spaced acoustic transceivers, and wherein the instructions further cause the processor to derive the slowness log based on the acoustic signal propagation measurements and the correction value. Element 15: wherein the acoustic caliper tool emits an acoustic signal with varying frequencies from 0-1 MHz to obtain the acoustic signal propagation measurements, and wherein the slowness log is interpreted to include mud cake or mud invasion information. Element 16: wherein the instructions further cause the processor to compare the tool inclination angle to a threshold associated with a stick-slip condition. Element 17: wherein the instructions further cause the processor to output a drilling parameter adjustment command or message in response to the comparison.

What is claimed is:

1. A method that comprises:
    deploying an acoustic caliper tool in a borehole, the acoustic caliper tool having a plurality of axially-spaced acoustic transceivers;
    transmitting an acoustic signal from each of the plurality of axially-spaced acoustic transceivers;
    obtaining corresponding acoustic signal reflection measurements from the transmitted acoustic signals by the plurality of axially-spaced acoustic transceivers;
    estimating a distance-to-boundary value for each of the plurality of axially-spaced acoustic transceivers based on the acoustic signal reflection measurements;
    calculating a tool inclination angle based on the distance-to-boundary values; and
    deriving a correction value for the estimated distance-to-boundary value based on the tool inclination angle.

2. The method of claim 1, further comprising applying the correction value to a borehole dimension log.

3. The method of claim 1, further comprising applying the correction value to a slowness log, wherein the slowness log provides information regarding a formation of the borehole, mud cake thickness on the borehole, or borehole fluids in the borehole.

4. The method of claim 1, further comprising:
    summing distance-to-boundary values associated with a first axial position along the acoustic caliper tool;
    summing distance-to-boundary values associated with a second axial position along the acoustic caliper tool; and
    comparing the summed distance-to-boundary values of the first axial position to the summed distance-to-boundary values of the second axial position to identify a borehole enlargement or borehole protrusion.

5. The method of claim 1, further comprising:
    summing distance-to-boundary values associated with different positions along the borehole to establish an average borehole size;
    summing distance-to-boundary values associated with a subsequent position along the borehole to establish a subsequent borehole size; and
    comparing the subsequent borehole size and the average borehole size to identify a borehole enlargement or borehole protrusion at the subsequent position.

6. The method of claim 5, further comprising applying the correction value for the estimated distance-to-boundary value to the identified borehole protrusion at the subsequent position.

7. The method of claim 1, further comprising obtaining acoustic signal propagation measurements using the plurality of axially-spaced acoustic transceivers and deriving the slowness log based on the acoustic signal propagation measurements and the correction value for the estimated distance-to-boundary value.

8. The method of claim 7, wherein obtaining the acoustic signal propagation measurements involves emitting an acoustic signal with varying frequencies from 0-1 MHz, and wherein the slowness log is interpreted to include mud cake or mud invasion information.

9. The method of claim 1, further comprising comparing the tool inclination angle to a threshold associated with a stick-slip condition.

10. The method of claim 9, further comprising changing a drilling parameter in response to the comparison.

11. A system that comprises:
    an acoustic caliper tool having a plurality of axially-spaced acoustic transceivers to transmit acoustic signals and obtain corresponding acoustic signal reflection measurements;
    at least one processor; and
    at least one memory in communication with the at least one processor, the at least one memory storing instructions that, when executed, cause the at least one processor to:
    receive the acoustic signal reflection measurements;
    estimate a distance-to-boundary value for each of the plurality of axially-spaced acoustic transceivers based on the acoustic signal reflection measurements;
    calculate a tool inclination angle based on the distance-to-boundary values; and
    derive a correction value for the estimated distance-to-boundary value based on the tool inclination angle.

12. The system of claim 11, wherein the instructions further cause the processor to apply the correction value to a borehole dimension log.

13. The system of claim 11, wherein the instructions further cause the processor to apply the correction value to the slowness log, wherein the slowness log provides information regarding a formation of the borehole, mud cake thickness on the borehole, or borehole fluids in the borehole.

14. The system of claim 11, wherein the instructions further cause the processor to:
    sum distance-to-boundary values associated with a first axial position along the acoustic caliper tool;
    sum distance-to-boundary values associated with a second axial position along the acoustic caliper tool; and
    compare the summed distance-to-boundary values of the first axial position to the summed distance-to-boundary values of the second axial position to identify a borehole enlargement or borehole protrusion.

15. The system of claim 11, wherein the instructions further cause the processor to:

sum distance-to-boundary values associated with different positions along the borehole to establish an average borehole size;

sum distance-to-boundary values associated with a subsequent position along the borehole to establish a subsequent borehole size; and compare the subsequent borehole size and the average borehole size to identify a borehole enlargement or borehole protrusion at the subsequent position.

16. The system of claim 11, wherein the acoustic caliper tool obtains acoustic signal propagation measurements using the plurality of axially-spaced acoustic transceivers, and wherein the instructions further cause the processor to derive the slowness log based on the acoustic signal propagation measurements and the correction value.

17. The system of claim 16, wherein the acoustic caliper tool emits an acoustic signal with varying frequencies from 0-1 MHz to obtain the acoustic signal propagation measurements, and wherein the slowness log is interpreted to include mud cake or mud invasion information.

18. The system of claim 11, wherein the instructions further cause the processor to compare the tool inclination angle to a threshold associated with a stick-slip condition.

19. The system of claim 18, wherein the instructions further cause the processor to output a drilling parameter adjustment command or message in response to the comparison.

\* \* \* \* \*

UNITED STATES PATENT AND TRADEMARK OFFICE
CERTIFICATE OF CORRECTION

PATENT NO. : 10,526,886 B2
APPLICATION NO. : 15/561330
DATED : January 7, 2020
INVENTOR(S) : Quang Huy Nguyen, Wei Hsuan Huang and Vinodh Kumar Palani It is certified that error appears in the above-identified patent and that said Letters Patent is hereby corrected as shown below:

In the Specification

In Column 7, Line 1, after --inclination angle-- delete "("a")" and insert --("α")--

Signed and Sealed this
Third Day of March, 2020

Andrei Iancu
*Director of the United States Patent and Trademark Office*